Nov. 22, 1927.
F. F. WEAVER
BROOD FRAME FOR BEEHIVES
Filed Oct. 18, 1926
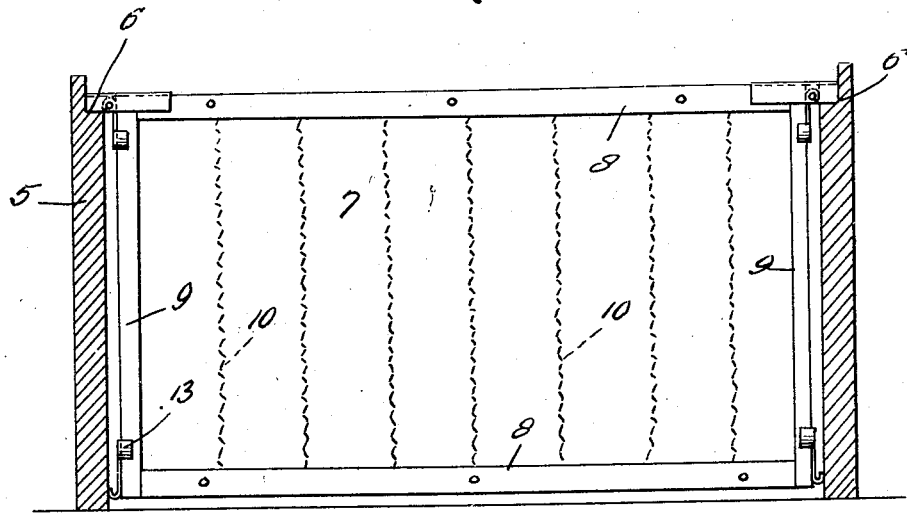
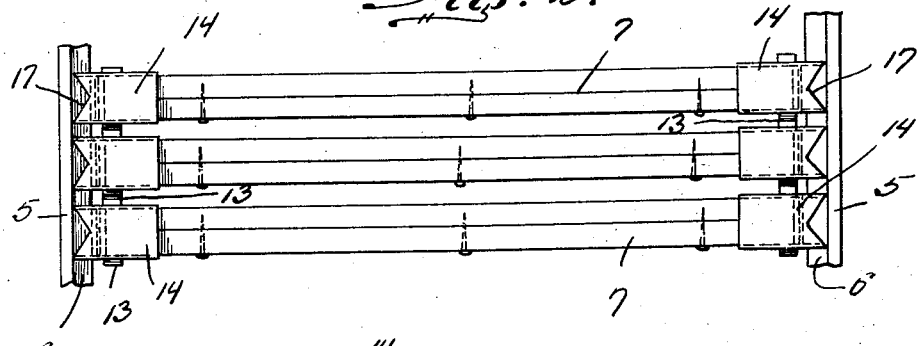
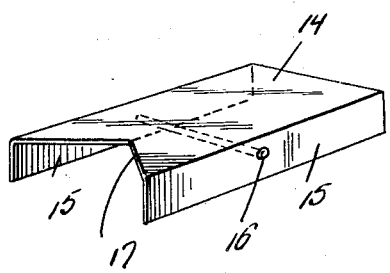
Inventor
Frank F. Weaver,
By Clarence A. O'Brien
Attorney Nov. 22, 1927.  
F. F. WEAVER  
1,650,170  
BROOD FRAME FOR BEEHIVES  
Filed Oct. 18, 1926   2 Sheets-Sheet 2
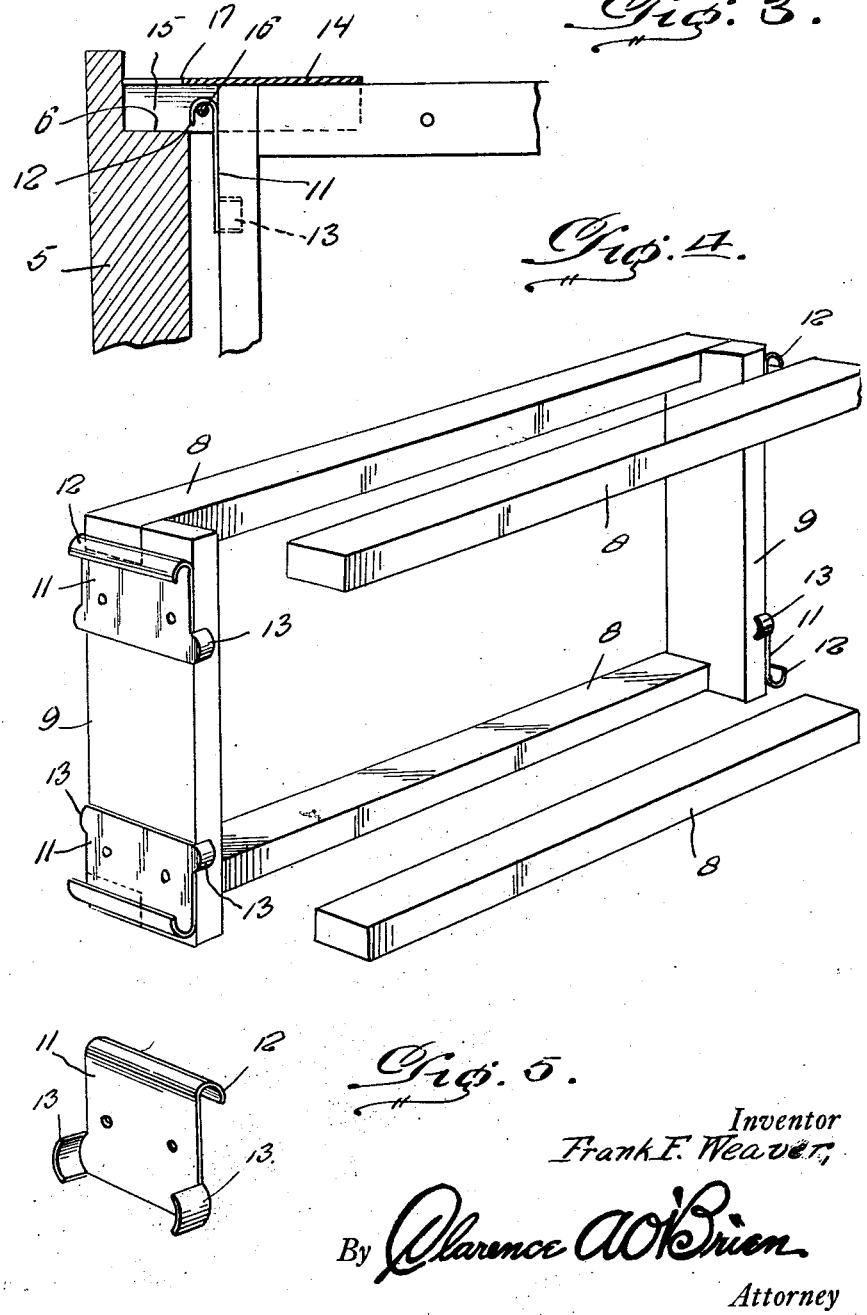

Patented Nov. 22, 1927.

1,650,170

UNITED STATES PATENT OFFICE.

FRANK F. WEAVER, OF DALLAS, OREGON.

BROOD FRAME FOR BEEHIVES.

Application filed October 18, 1926. Serial No. 142,336.

This invention relates to new and useful improvements in brood frames for bee hives and has for its primary object to provide such a frame that may be readily reversed in the hive in order that the frame may be completely filled, it is of course well known in the art that bees always work from the top down. Due to the low temperature prevailing at the bottom of the hive seldom, if ever, are the frames completely filled. Accordingly, by reason of the present type of frame after the bees have worked a sufficient distance in a downward direction the frames are removed and inverted and then again disposed within the hives resulting in a completely filled frame.

A further and important object is to provide means for facilitating the ready support of the frame within the hive, and also the ready removal of the same therefrom so as to permit the inverting of the frame.

It is a further and most important object of the invention to provide supporting means for the frame within the hives that will maintain the frame positively in spaced relation with respect to the hive casing so that the bees will not become crushed or injured by the contact of the frames with the hive casing regardless of whatever the position in which the casing may be placed. This means also prevents the sealing of the frames to the hive casing which is a great disadvantage in the brood frames now generally in use.

Other objects will become apparent as the nature of the invention is better understood, the same comprising the novel form, combination, and arrangement of parts hereinafter more fully described, shown in the accompanying drawing and claimed.

In the accompanying drawings wherein like reference characters indicate corresponding parts throughout the several views:

Figure 1 is a side elevation of a brood frame constructed in accordance with the present invention, the same being shown as actually disposed within the hive casing.

Figure 2 is a fragmentary top plan view of a hive casing within which is disposed a plurality of brood frames constructed in accordance with the present invention.

Figure 3 is an enlarged fragmentary section through the upper edge of the hive casing, a corner of one of the frames being disclosed in side elevation and the means for supporting the frames within the casing being also disclosed.

Figure 4 is a group perspective of one of the frames per se.

Figure 5 is a perspective of one of the metallic plates arranged upon the opposite sides of the frame and adjacent the upper and lower ends thereof, said plates being so constructed as to permit of the hanging of the frames within the hive and also so as to maintain the frame in spaced relation with respect to the hive casing and in spaced relation with respect to the other frames within the casing, and Figure 6 is a top perspective of one of the plate members provided for engagement at one end within a lid at the open top of the hive casing and at its opposite end above the corner of the frame and having means cooperating with the brooder frame plate members for supporting the frame within the hive casing.

Now having reference to the drawings, 5 indicates a bee hive casing of conventional design the end walls of which are in the present instance formed at the top side of the casing with supporting ledges 6—6. Adapted for disposition within said casing are a plurality of brood frames constructed in accordance with the present invention and designated generally by the reference character 7. Each frame is preferably of wood construction and of general rectangular configuration as disclosed in Figure 1. The upper and lower sides of said frame are in the form of a pair of bars or cleats 8—8, the combined widths of which are equivalent to the width of the end members 9—9 of said frame. Preferably one of the bars or cleats at the top and bottom sides of the frame is mortised within the upper ends of the end bars 9—9 while the other bars or cleats are disposed frictionally within the said end bars and if desired rigidly secured thereto by tacks, nails, or other fastening means. By reason of these sectional top and bottom walls, the transversely arranged comb supporting wires or reinforcing strips 10 may be secured at their opposite ends between the bars or cleats at the top and bottom sides of said frames. However, I do not desire to be limited to such a specific construction for the reason that the top and bottom sides of the frames may be in the form of single bars or cleats and so constructed as to permit the attachment of the comb supporting wires 10 thereto.

Secured to the outer sides of the end bars 9—9 adjacent the upper and lower ends thereof are metallic plates 11—11 the outer edges of which are turned over in an inward direction for providing hook shaped fingers 12—12. At the inner edges of said plates 11—11, the opposite sides thereof are provided with inwardly extending lugs 13—13 being bent into curvilinear formation and engaging the side edges of the end bars 9—9 as clearly indicated in Figure 4. By reason of these lugs the various frames within the beehive casing will at all times be maintained in spaced relation so as to prevent the sealing of the various frames and also to prevent the bees from becoming crushed or injured between the frames. By a consideration of Figure 1 it will also be noted that when the frames are disposed within the casing the hook shaped fingers 12 of the lowermost plates 11 will engage the end walls of the hive for maintaining the ends of the frames in spaced relation with respect to the casing so as to prevent in this instance also the sealing of the ends of the frames to the casing and the crushing or injuring of the bees between the frames and casing for thus overcoming a great disadvantage experienced in the use of brood frames now generally in use.

The invention further consists of a pair of metallic plates 14—14 for each brood frame disposed within the hives, these plates being constructed at their opposite longitudinal edges with depending flanges 15—15 extending between which is a cross pin 16.

In actual practice the plates 14 are arranged upon the top walls of the frame at opposite ends thereof and this in such a manner that the hooked fingers 12 of the frame attached plates 11—11 will be engaged over the cross pins 16 of said plates. Upon disposing the frames within the casing the outer ends of the side flanges 15—15 of said plates will rest upon the ledges 6—6 of the casing 5 and by reason of the small area thereof there will be little or no liability of any bees that may be resting upon the ledges becoming crushed. Furthermore, the inner ends of all of the plates are provided with V-shaped notches 17 for permitting any bees that may be upon the ledges to move into or out of the hive casing.

It will thus be seen that I have provided a highly novel, simple, and efficient form of brood frame for bee hives that is well adapted for all the purposes heretofore designated, and even though I have herein shown and described the invention as consisting of certain detail structural elements it is nevertheless to be understood that some changes may be made therein without effecting the spirit and scope of the appended claims.

Having thus described the invention, what I claim as new and desire to secure by Letters Patent is:—

1. In combination with a brood frame, and a bee hive casing, a pair of members for engagement with the upper edge of the casing, and two longitudinally aligned corners of the frame, and means at the four corners of the frame constructed for attachment to said members whereby said frame may be supported within the casing from its upper or lower side.

2. In combination with a brood frame, and a bee hive casing, a pair of members for engagement with the upper edge of the casing, and two longitudinally aligned corners of the frame, and means at the four corners of the frame constructed for attachment to said members whereby said frame may be supported within the casing from its upper or lower side, said means at the corners of the frame being so constructed as to maintain the frame in spaced relation with the side walls of the casing.

3. In combination, a brood frame for bee hives, a metallic plate secured to the outer side of each end bar of the frame adjacent each corner thereof, the outer edge of each plate being bent to provide a hook, a pair of plate members adapted for quick detachable engagement upon the upper corners of the frame and for rest upon the upper edges of a beehive casing, and means carried by said plate members adapted for cooperation with the hooks of the uppermost pair of metallic plates carried by the ends of the frame for facilitating the attachment of the frame to said plate members so as to support the frame within the bee hive.

4. In combination, a brood frame for bee hives, a metallic plate secured on the outer side of each of the end bars of the frame at each of the corners thereof, the outer edge of each plate being bent to provide a hook, means adapted for cooperation with the hooks of the uppermost pair of plates for suspending the frame from the upper edge of a beehive casing, the hooks formed on the lowermost pair of plates adapted to engage the inner face of the end walls of the bee hive casing for spacing the ends of the frame with respect to the end walls of the casing.

5. In combination, a brood frame for bee hives, a metallic plate secured on the outer side of each of the end bars of the frame at each of the corners thereof, the outer edge of each plate being bent to provide a hook, means adapted for cooperation with the hooks of the uppermost pair of plates for suspending the frame from the upper edge of a beehive casing, the hooks formed on the lowermost pair of plates adapted to engage the inner faces of the end walls of the beehive casing for spacing the ends of the frame with respect to the end walls of the casing, and lugs formed on the side edges of each plate adapted for cooperation with the adjacent lugs of the other frames for spacing said frames with respect to each other.

6. In combination, a brood frame for bee hives, supporting members at the four corners of the frame, and a pair of frame suspension members adapted for quick detachable engagement with the supporting members at the upper corners of the frame to permit the hanging of the frame upon the upper edge of a bee hive casing.

7. In a means for suspending a brooder frame within a bee hive casing, a plate secured at each of the upper corners of the frame and extending beyond the ends thereof, depending flanges on the sides of the plate, the outer end portions of said flanges adapted to rest on a ledge formed in the upper portion of the bee hive casing, the outer end of each plate being formed with a bee exit.

In testimony whereof I affix my signature.

FRANK F. WEAVER.